Oct. 13, 1936.　　L. M. PERSONS　　2,057,309
HEATING SYSTEM CONTROL MEANS
Filed Aug. 13, 1935
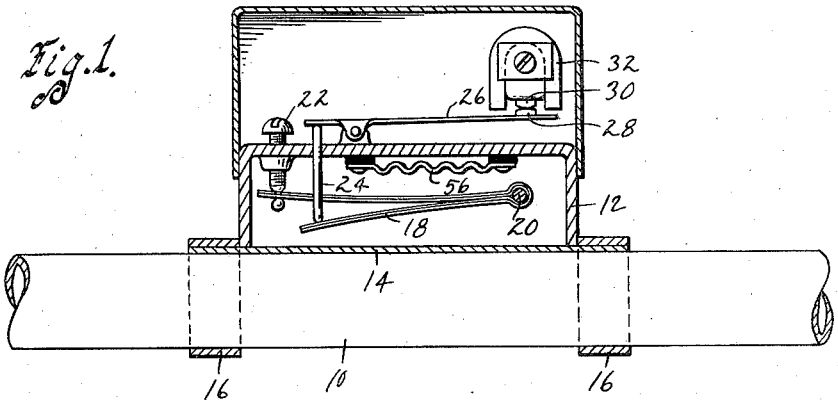
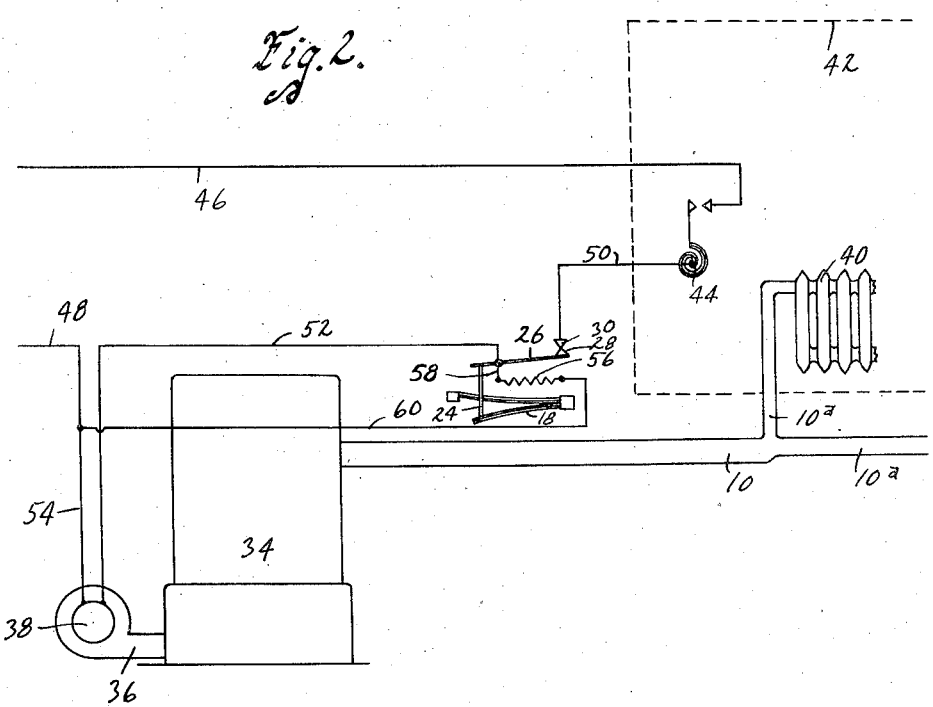
Inventor
Lawrence M. Persons
By Bair, Freeman & Sinclair
Attorneys
Witness
H. S. Munzenmaier

UNITED STATES PATENT OFFICE 2,057,309

HEATING SYSTEM CONTROL MEANS

Lawrence M. Persons, Des Moines, Iowa, assignor to Penn Electric Switch Co., Des Moines, Iowa, a corporation of Iowa Application August 13, 1935, Serial No. 35,989

6 Claims. (Cl. 236—68)

An object of my invention is to provide a heating system control means including a surface switch and a simple means for modifying the action of the surface switch so that it can operate over a closer differential than is possible without the use of such means.

A further object is to render a surface switch more sensitive to the temperature changes of the surface of a heating medium conduit or the like by the use of a heater element to modify the action of the bimetal or other element responsive to the surface temperature of the conduit, the heating element being energized only during one-half of the switch cycle in order to produce the desired results.

A further object is to provide in connection with a surface switch, a heater element so connected with the switch that it is energized only when the switch is closed and thereupon modifies the timing of the switch so that it will open sooner than the temperature of the surface to which the switch is responsive would otherwise open it.

With these and other objects in view my invention consists in the construction, arrangement and combination of the various parts of my device, whereby the objects contemplated are attained, as hereinafter more fully set forth, pointed out in my claims and illustrated in the accompanying drawing, in which:

Figure 1 is a side elevation of a heating medium conduit with my surface switch connected thereto and shown in section.

Figure 2 is an electro-diagrammatic view of a heating system including my surface switch.

On the accompanying drawing, I have used the reference numeral 10 to indicate a conduit for hot water or other heater medium or the like. The surface switch includes a casing 12 having a wall 14 positioned against the conduit 10 for conducting heat from the surface thereof to the space within the casing 10. The wall 14 is retained in position against the surface of the conduit 10 by bands or the like 16.

Within the casing 12 a pivoted bimetal element 18 is fastened on a pin 20. One end thereof is made adjustable by means of a screw 22 while the other end thereof is adapted to actuate a pin 24. The pin 24 cooperates with a pivoted switch arm 26 to separate switch contacts 28 and 30 when a predetermined temperature of the conduit 10 warps the lower strip of the bimetal element 18 upwardly sufficient to overcome the pull of a magnet 32 provided for giving the switch snap action.

In Figure 2 I show a heat generator 34, such as the hot water boiler of a heating system heated by a fuel burner 36, the blower motor of which is indicated at 38. The pipe 10 extends from the boiler 34 and has suitable branches, such as 10a, one of which is indicated as being connected with a radiator 40 within a room 42. A room thermostat 44 is responsive to the temperature in the room 42 for controlling the burner motor 38. The surface switch is shown in position for response to the surface temperature of the pipe 10 and current supply wires are indicated at 46 and 48. Other wires are indicated at 50, 52 and 54 for connecting the various parts together electrically.

It will be noted that the switch contacts 28 and 30 and the room thermostat are connected in series and this is for the purpose of cutting off the burner circuit when the heating medium becomes excessively hot, the surface switch thus serving as a safety device to prevent overheating.

Heretofore it has been customary to provide a boiler switch having a temperature responsive element directly responsive to the heating medium. To do this the heating plant must be drained of water in order to tap the temperature responsive element into the heating medium conduit. If a surface switch is used, it is not nearly so sensitive to the temperature of the heating medium as the heat must be transferred through the heating medium conduit wall before it can affect the temperature responsive element of the switch. I therefore provide in connection with the surface switch a heater element 56 arranged within the casing 12 so that the heat thereof will affect the bimetal element 18 and modify the action thereof. The heater element 56 is connected by wires 58 and 60 with the switch arm 26 and the wire 48 respectively.

This provides a secondary source of heat, the primary source being the heat of the medium within the conduit 10 and the particular electrical connections illustrated for the heater element 56 provide for energization thereof only when the switch contacts 28 and 30 are closed. These are normally closed and accordingly when the room thermostat calls for heat by closing the circuit the heater element 56 will also be energized. The heat radiated therefrom accordingly will cause the bimetal element 18 to warp to circuit opening position sooner than it otherwise would, thus anticipating the rise in temperature of the heating medium within the conduit 10.

This will cause the surface switch to open sooner than if it were responsive only to the temperature of the heating medium and will thereby cause in effect a closer differential of operation of the surface switch. This differential, I have found by experimentation is much closer than where the heater element 56 is not provided.

By the use of the heater element in the manner described it is possible to use a surface switch instead of one of the immersion type and thus simplify the installation, yet, at the same time, secure the small differential of operation desired for a boiler switch.

Some changes may be made in the construction and arrangement of the parts of my device without departing from the real spirit and purpose of my invention, and it is my intention to cover by my claims, any modified forms of structure or use of mechanical equivalents, which may be reasonably included within their scope.

I claim as my invention:

1. In a heating system control means, a heat generator, a heating medium heated thereby, a conduit for supplying said heating medium to a radiator within a space to be heated, a thermostat within said space for controlling the operation of said heat generator in accordance with the temperature within the space and means for additionally controlling such operation in accordance with the temperature of the surface of said conduit, said last means comprising a thermostat responsive to the surface temperature of said conduit, and a heater influencing said last thermostat and rendered inoperative upon opening of the circuit therethrough.

2. In a heating system control means, a heat generator, a heating medium heated thereby, a conduit for supplying said heating medium to a radiator within a space to be heated, a thermostat within said space for controlling the operation of said heat generator in accordance with the temperature within the space and means for additionally controlling such operation in accordance with the temperature of the surface of said conduit, said last means comprising a thermostat responsive to the surface temperature of said conduit and a secondary source of heat controlling said second thermostat, said secondary source of heat being controlled by said second thermostat.

3. The combination of a heat generator and a space heated thereby with means for controlling the generation of heat comprising a thermostat responsive to the temperature within said space and a second thermostat responsive to the surface temperature of the means which conducts the heat from said heat generator to said space, a heater associated with said second thermostat for modifying the action thereof and control means for said heater operable to cause de-energization thereof when said second thermostat opens the circuit of said heat generator.

4. The combination of a heat generator and a space heated thereby with means for controlling the generation of heat comprising a thermostat responsive to the temperature within said space and a second thermostat responsive to the surface temperature of the means which conducts the heat from said heat generator to said space, a heater associated with said second thermostat for modifying the action thereof and control means for said heater comprising a series circuit including both of said thermostats and said heater.

5. In a heating system and control means, a heat generator, a heating medium heated thereby, a radiator to be heated by said heating medium and located within a space to be heated, a thermostat within said space for controlling the operation of said heat generator in accordance with the temperature within the space and means for additionally controlling such operation in accordance with the temperature of said heating medium, said last means comprising a thermostat responsive to the temperature of the heating medium and a heater influencing said last thermostat and rendered inoperative upon opening of the circuit therethrough.

6. The combination of a heat generator for heating a medium and a space heated by said medium with means for controlling the generation of heat comprising a thermostat responsive to the temperature within said space and a second thermostat responsive to the temperature of the medium heated by said heat generator, a heater associated with said second thermostat for modifying the action thereof and control means for said heater comprising a series circuit including said second thermostat and said heater.

LAWRENCE M. PERSONS.